(12) United States Patent
Hong

(10) Patent No.: US 6,477,664 B1
(45) Date of Patent: Nov. 5, 2002

(54) BREAKPOINT INTERRUPT GENERATING APPARATUS IN A SUPERSCALAR MICROPROCESSOR

(75) Inventor: Se Kyoung Hong, Kyoungki-do (KR)

(73) Assignee: Hyundai Electronics Industries Co., Ltd., Ichon (KR)

( * ) Notice: Subject to any disclaimer, the term of this patent is extended or adjusted under 35 U.S.C. 154(b) by 0 days.

(21) Appl. No.: 09/223,388

(22) Filed: Dec. 30, 1998

(30) Foreign Application Priority Data

Dec. 30, 1997 (KR) ............................................. 97-77867
Dec. 30, 1997 (KR) ............................................. 97-77896

(51) Int. Cl.$^7$ ................................................. H02H 3/05
(52) U.S. Cl. ............................. 714/35; 714/34; 714/42
(58) Field of Search ............................. 714/35, 42, 53, 714/54, 34; 711/202, 203, 200, 209, 211, 213, 214, 217, 218, 219

(56) References Cited

U.S. PATENT DOCUMENTS

| | | | | |
|---|---|---|---|---|
| 4,775,886 A | * | 10/1988 | Hirosawa | 358/77 |
| 4,860,195 A | * | 8/1989 | Krauskopf | 711/202 |
| 5,053,944 A | * | 10/1991 | Krauskopf | 711/202 |
| 5,165,027 A | * | 11/1992 | Krauskopf | 711/206 |
| 5,530,804 A | | 6/1996 | Edgington et al. | 714/30 |
| 5,640,542 A | | 6/1997 | Whitsel et al. | 714/34 |
| 5,664,159 A | | 9/1997 | Richter et al. | 711/207 |
| 5,694,589 A | | 12/1997 | Glew et al. | 382/233 |
| 5,717,909 A | | 2/1998 | Nemirovsky et al. | 714/54 |
| 5,983,000 A | * | 11/1999 | Perron | 714/8 |
| 6,052,801 A | * | 4/2000 | Hammond et al. | 714/38 |
| RE36,766 E | * | 7/2000 | Krauskopf | 711/203 |

FOREIGN PATENT DOCUMENTS

| | | |
|---|---|---|
| JP | 57-85145 | 5/1982 |
| JP | 57-155650 | 9/1982 |
| JP | 62-95644 | 5/1987 |

* cited by examiner

Primary Examiner—Peter Wong
Assistant Examiner—Tim Vo
(74) Attorney, Agent, or Firm—Jacobson Holman, PLLC

(57) ABSTRACT

The present invention provides a breakpoint interrupt generation apparatus in a superscalar microprocessor, which can be implemented by small amount of hardware resources, thereby reducing required chip area. The breakpoint interrupt generation apparatus in a n-way superscalar microprocessor comprises: an address control element for receiving a plurality of addresses and a plurality of request signals generated for memory access and for producing the received address one-by-one for one cycle; a breakpoint address storage for storing an intended address for breakpoint generation; a control information storage for storing control information required for breakpoint generation; an address match element for comparing the address from said breakpoint address storage with the address applied from the address control element so as to produce a match signal indicating whether the two addresses are identical; and an enable element for checking whether a breakpoint is generated every cycle based on the match signal from the address match element, the control information from the control information storage and a bus cycle information and for generating a breakpoint interrupt signal in response to a complete signal from the address control element.

14 Claims, 4 Drawing Sheets

BREAKPOINT INTERRUPT GENERATING APPARATUS IN A SUPERSCALAR MICROPROCESSOR

FIELD OF THE INVENTION

The present invention relates to a microprocessor; and, more particularly, to an apparatus for generating a breakpoint interrupt of computer program.

DESCRIPTION OF THE PRIOR ART

In the process of developing a computer software program, a program debugging is performed for analyzing the performance of the program and eliminating errors in the program. The debugging is considered to be important part in the development of a program and often requires more time than the composition of the program does.

A method for debugging a computer program is that events to be desired for observation are pre-determined and then when such events occurs in the trial execution of the program for debugging, the execution is stalled for inspection of the values stored in programmer visible registers and so on. For example, in order to inspect program and data stored in a memory at a specific case, an address to be used for the specific case is pre-set and then, when the generated address is matched with the pre-set address, a breakpoint is generated. When the breakpoint is generated, the program execution is stalled for the inspection of the program context.

There have been proposed various approaches for generating such breakpoint interrupts and one of them is to modify the program, which is inserting a software interrupt instructions at a specific address of the software program. However, though such a method can be easily implemented, it has a disadvantage in that a breakpoint can not be set for the address referring to data.

Another approach for generating a breakpoint interrupt is a hardware-implementation provided outside a microprocessor or a computer. Such hardware compares a generated address by computer with a pre-set address and, if any match is made, it sends a hardware interrupt signal to the microprocessor or the computer so as to stop the execution. However, such method needs much cost for implementation and additive space for printed circuit board of the hardware. In addition, for a high-speed processor, the breakpoint interrupt hardware can not in general accord with the processor in speed, whereby the breakpoint interrupt is not actually generated in time but later time. Also, when the processor has an address generation unit on the same chip, since the address to be seen from the outside of the processor is not a logical address of the program but a physical address for memory access, the breakpoint interrupt generation can not be made by this approach.

A still another approach is that an apparatus for generating breakpoint is provided within the processor, in which the apparatus includes a plurality of address registers for storing the pre-set addresses to be compared, a plurality of control registers for storing control information related to the breakpoint generation, and a comparator for comparing one of the pre-set addresses with a generated address by the processor.

When such a method is applied to RISC (Reduced Instruction Set Computer) processor, the length of instruction and data are always the same (e.g. always 4 bytes (=32 bits)) and the values to be compared are multiples of 4. Therefore, the implementation of comparator is easy.

However, in a CISC (complex Instruction Set Computer) processor such as X86 series of Intel, the length of instruction and data are varying. Therefore, for implementation, a large quantity of hardware resource is needed. Here, if the breakpoint address and the range thereof are provided with constraints, the design of comparator becomes more or less easy. For example, in the case of 386 processor of Intel, the design of comparator can be easy by providing with the constraint in that any value can be compared if the range of the breakpoint address is "1"; only even addresses can be compared if "2"; and only the addresses of 4's multiple can be allowed to be compared if "4".

However, in an n-way superscalar processor such as a Pentium processor of Intel, since multiple reference addresses are generated during one cycle, each of breakpoint address registers should have n read ports and n comparators each for comparing a corresponding breakpoint address register. Thus, there is a problem that considerable amount of hardware resources are required.

Next, a conventional address match circuit in an apparatus for generating breakpoint is shown in FIG. 1, which is for the case that there is no constraint in the breakpoint address and the range of the breakpoint address. Especially, FIG. 1 is a schematic block diagram of an address match circuit in a conventional apparatus for generating breakpoint.

A start address Bstart of breakpoint is set from the breakpoint address register and then the breakpoint address is added with a range value R by the first adder 100 so that a stop address Bstop of the breakpoint address is produced. For example, if the value of the breakpoint address register is FFF in hexadecimal and the R is 4 bytes, then Bstart is FFF and Bstop is 1002. Also, for the address generated from an address generation unit, a start address Mstart for memory reference is determined and the Mstart is added with the operand size OS so that a stop address of memory reference is generated. For example, if the generated address from the address generation unit is 1000 in hexadecimal and OS is 2 bytes, then Mstart is 1000 in hexadecimal and Mstop is 1001 in hexadecimal.

Next, for generating a breakpoint interrupt, the following conditions 1 and 2 must be satisfied between Bstart, Bstop, Mstart, and Mstop.

[Condition 1]

Bstart≦Mstop

[Condition 2]

Mstart≦Bstop

For doing this, Bstart, Bstop, Mstart and Mstop are compared with one another by the first and the second comparators 140 and 160 and then the compared results are logic-ANDed in a AND gate 180 so as to produce a final match signal. For instance, if Bstart is FFF in hexadecimal, Bstop 1002 in hexadecimal, Mstart 1000 in hexadecimal and Mstop 1001 in hexadecimal, then the above condition is satisfied and thus a final address match signal is generated.

As described above, the conventional apparatus for generating breakpoint without any constraint between the breakpoint address and the range of the breakpoint address, requires much hardware resources such as adder, comparator and logic AND gate in order to confirm whether there is any match for breakpoint address. Thus, the time for generating match signal becomes critical.

SUMMARY OF THE INVENTION

The present invention is addressed to solve the above problem. The object of the present invention is to provide an apparatus for generating breakpoint in a superscalar microprocessor, which is capable of being implemented by small amount of hardware resources and thus the required chip area can be reduced.

An other object of the present invention is to provide an address match circuit, which can be used for generating a breakpoint interrupt in a superscalar microprocessor and implemented with small amount of hardware resources, thereby reducing the required chip-area therefor.

According to one preferred embodiment of the present invention in order to achieve the above object, there is provided a breakpoint interrupt generation apparatus in a n-way superscalar microprocessor comprising: an address control means for receiving a plurality of addresses and a plurality of request signals generated for memory access and for producing the received address one-by-one for one cycle; a breakpoint address storage for storing an intended address for breakpoint generation; a control information storage for storing control information required for breakpoint generation; an address match means for comparing the address from said breakpoint address storage and the address applied from the address control means so as to produce a match signal indicating whether the two addresses are identical; and an enable means for checking whether a breakpoint is generated every cycle based on the match signal from the address match means, the control information from the control information storage and a bus cycle information and for generating a breakpoint interrupt signal in response to a complete signal from the address control means.

In accordance with another embodiment of the present invention, there is provided a breakpoint interrupt generation apparatus in an n-way superscalar microprocessor comprising: an address control means for inputting n addresses in parallel and then producing one by one the inputted address every cycle and outputting a stall signal and a complete signal, said stall signal indicating that an input operation for the next n addresses should be installed until all of the inputted addresses being outputted, and said complete signal indicating when all of the inputted addresses are outputted; a breakpoint address memory for storing at least one breakpoint address; an address match means for comparing the output of the address control means with the breakpoint address, so as to produce an address match signal; and a logic means for generating a breakpoint interrupt based on the address match signal when the complete signal is generated.

The breakpoint interrupt generation apparatus further comprises a mode register indicating whether an operation mode of the breakpoint interrupt generation apparatus is "debugging mode" and said address control means is enabled when the mode register indicates the debugging mode.

In accordance with another aspect of the present invention, there is provided an address match circuit in a breakpoint interrupt generation apparatus of a superscalar microprocessor, for detecting whether an inputted address corresponds to a predetermined range of address requiring a breakpoint interrupt generation, comprising: a breakpoint address memory for storing a breakpoint address that is start address requiring a breakpoint interrupt generation; a range memory for storing the predetermined range of address; an operand size memory for storing a size value of an operand being performed; a subtractor for subtracting the inputted address from the breakpoint address; and a detecting means for detecting that the output of the subtractor is equal to or larger than an inverted value of the size value of the operand and that the output of the subtractor is equal to or less than the predetermined range of address.

When the output of the subtractor is M-bits and both of the operand size and the address range are represented by L-bits, said detecting means comprises: a first detector for detecting that all of the upper M-L bits of the output of the subtractor are "0"; a second detector for detecting that all of the upper M-L bits of the output of the subtractor are "1"; a first comparator for comparing so as to detect that the least L bits of the output of the subtractor is equal to or less than the address range; a second comparator for comparing so as to detect that the least L bits of the output of the subtractor is equal to or larger than an inverted value of the operand size; and a logic means for producing the address match signal based on the outputs of the first and the second detectors and the first and the second comparators.

BRIEF DESCRIPTION OF DRAWINGS

For more complete understanding of the present invention and the advantage thereof, reference is now made to the following description taken in conjunction with the accompanying drawings in which.

DETAILED DESCRIPTION OF THE INVENTION

The preferred embodiments of the present invention will be in detail explained with reference to the accompanying drawings.

Generally, in order to generate breakpoint, an address is compared during one cycle using various values such as breakpoint address register's values, range, n addresses generated in a current address generation unit and operand size. The present invention is based on that the processing speed of the processor during debugging is not critical, that is not important factor. Thus the breakpoint interrupt is generated by a hardware for controlling the generated n address to supply only one every cycle, breakpoint address registers each having one read-port, and comparators each corresponding to each breakpoint address register.

Figure 1:
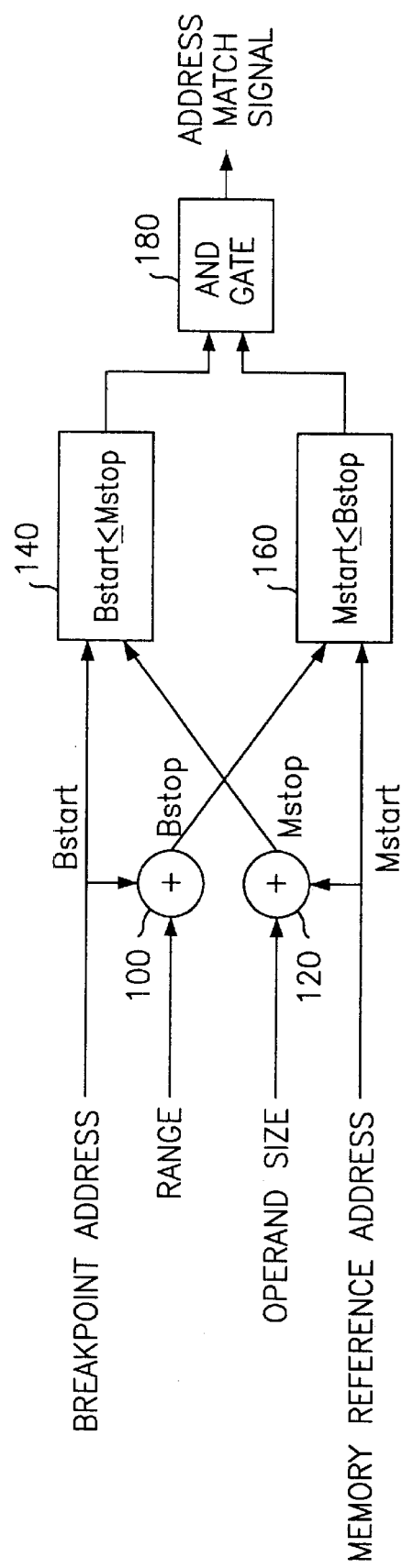
FIG. 1 is a schematic block diagram of an address match circuit portion in a conventional breakpoint interrupt generation apparatus.
Figure 2:
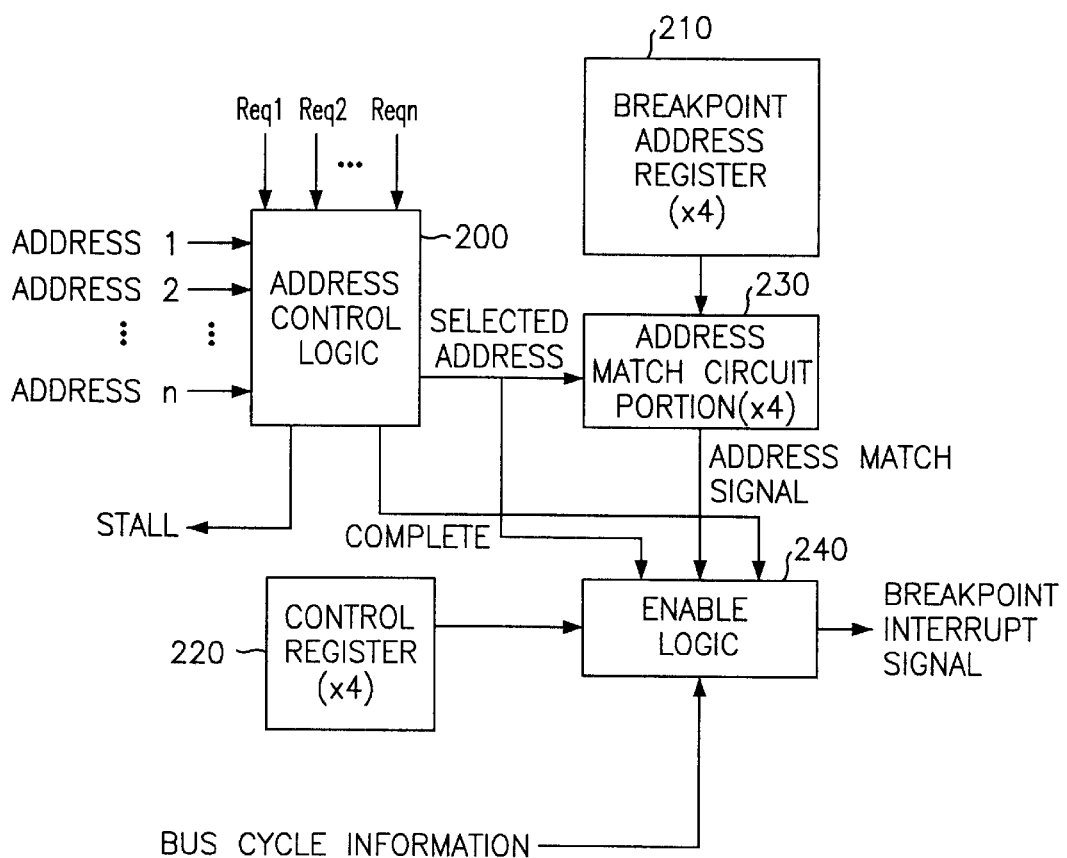
FIG. 2 is a block diagram of a breakpoint interrupt generation apparatus according to one embodiment of the present invention.

FIG. 2 is a block diagram for illustrating a breakpoint interrupt generation apparatus according to one preferred embodiment of the present invention. The breakpoint apparatus comprises an address control logic 200, a breakpoint address register 210, a control register 220, an address match circuit portion 230 and an enable logic 240. The address control logic 200 receives n request signals Req1, Req2, . . . Reqn generated for memory access and produces one address per one cycle. The breakpoint address register 210 stores the intended address for generating breakpoint. The control register 220 stores the control information required for generating a breakpoint interrupt. The address match circuit portion 230 compares the value of the breakpoint address register with the applied address from the address control logic 200, so as to produce a signal indicating whether the two addresses match or not. The enable logic 240 receives the information from the address match circuit portion 230, the information of the control register 220 and a bus cycle information, and then checks whether a breakpoint is generated every cycle so as to store the result. When the enable logic 240 receives a complete signal from the address control logic 200, it generates a final breakpoint interrupt signal.

The address control logic 200 is composed of FSM (Finite State Machine), which generates a stall signal to the processor when the number of the received address is the maximum and then selects one address for one cycle.

As the control information stored in the control register 220, there may be enable information for the breakpoint interrupt generation apparatus, the enable information for respective breakpoint address registers, the breakpoint type (e.g. input/out type, memory program reference or memory data reference), the range and so on.

Figure 3:
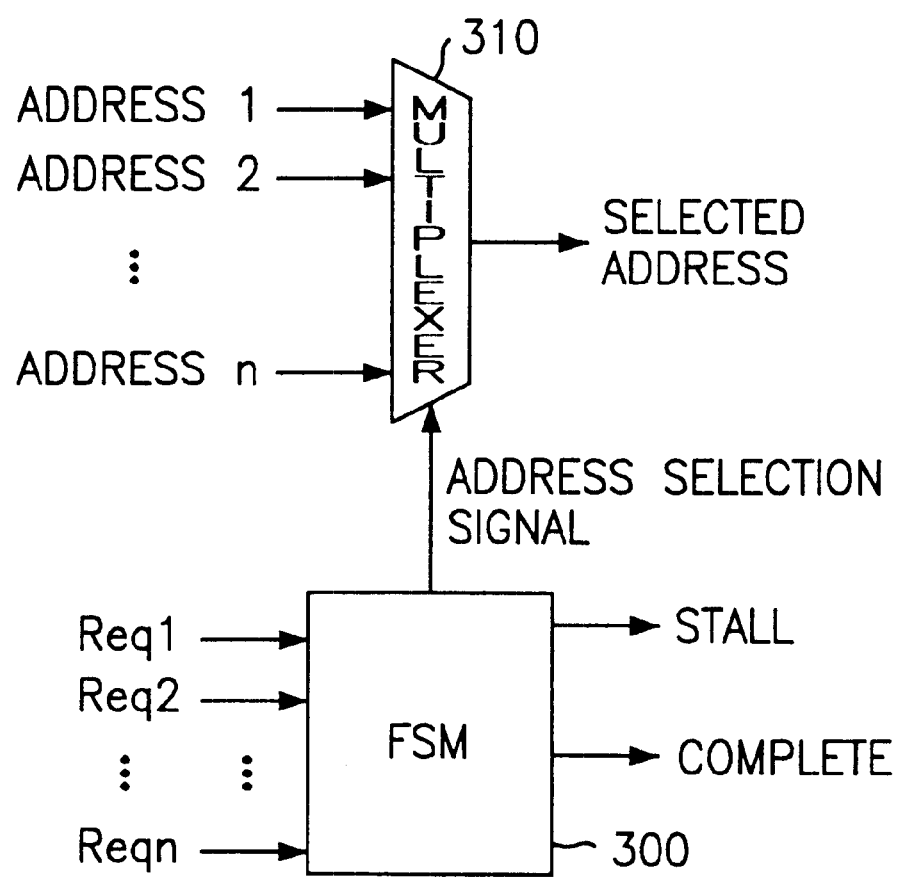
FIG. 3 is an internal block diagram of an address control logic of the breakpoint interrupt generation apparatus shown in FIG. 2, according to one preferred embodiment of the present invention.

FIG. 3 is an internal block diagram of the address control logic in the breakpoint generation logic shown in FIG. 2, according to one preferred embodiment of the present invention, which comprises FSM 300 and multiplexer 310. The FSM 300 generates an address selection signal, the stall signal and the complete signal in response to the request signals Req1, Req2, . . . Reqn applied from a segment unit (not shown). The multiplexer 310 selects one among the n addresses for one cycle in response to the address selection signal.

FSM 300 is composed of n states along with an idle state. In idle state, FSM 300 receives a request signal corresponding to respective address and then transits to a corresponding state. Also, FSM 300 produces a selection signal indicating that the respective address should be selected. For example, if the request signals are for the addresses 1, 3 and 5 (that is, if Req1, Req3 and Req5 are applied), then the first transition is made from the idle state to the first state. At this time, the stall signal is generated and the multiplexer 310 is applied with the address selection signal indicating that the address 1 should be selected.

In the next cycle, the confirmation is made whether there is the request for the address 3 (or Req3), and then the transition to the third state is performed. At this time, the stall signal is also generated and the address selection signal corresponding to the address 3 is applied to the multiplexer 310. Similarly, in the following cycle, the confirmation is made as to whether there is a request for the address 5 (or Req5), and then the transition to the fifth state is performed. The stall signal is generated and the address selection signal corresponding to the address 5 is applied to the multiplexer 310. Since there is no request signal, the transition to the idle state is made for the following cycle and the complete signal is applied to the enable logic 240.

Next, the address match circuit portion 230 will be in detail explained in the following description, which compares the value of the breakpoint address register with the inputted address from the address control logic 200 so as to produce the compared result indication whether the two addresses match or not.

The above conditions 1 and 2 can be converted into the following conditions 3 and 4 by substituting the terms Mstop and Bstop with Mstart+(OS−1) and Bstart+(R−1), respectively.

[Condition 3]
  Bstart≦Mstart+(OS−1)
[Condition 4]
  Mstart≦Bstart+(R−1)
By combining the above conditions 3 and 4, the following condition 5 can be acquired.
[Condition 5]
  −OS≦Mstart−Bstart≦R In the above conditions, 'OS' represents the size of operand and 'R' represents the range value of breakpoint address, respectively.

In a 32-bit processor, since the values of 'OS' and 'R' are generally from one byte to 4 bytes, the number of byte can be expressed by 2 bits, for example "00" represents one byte; "01" two bytes; "10" three bytes; and "11" four bytes, respectively.

In the above condition 5, when Mstart is larger than Bstart, the value of (Mstart−Bstart) should be less than R in order to generate a breakpoint. Alternatively, the value of (Mstart−Bstart) is larger than −OS, when Mstart is less than Bstart. Here, since OS andR can be expressed by 2 bits, the following conditions should be met for generating a breakpoint.

When the value of (Mstart−Bstart) is positive, the least two significant bits are equal to or less than R and the other upper bits are all "0". Alternatively, when the value of (Mstart−Bstart) is negative, the least two significant bits are equal to or larger than −OS and the other upper bits are all "1".

Figure 4:
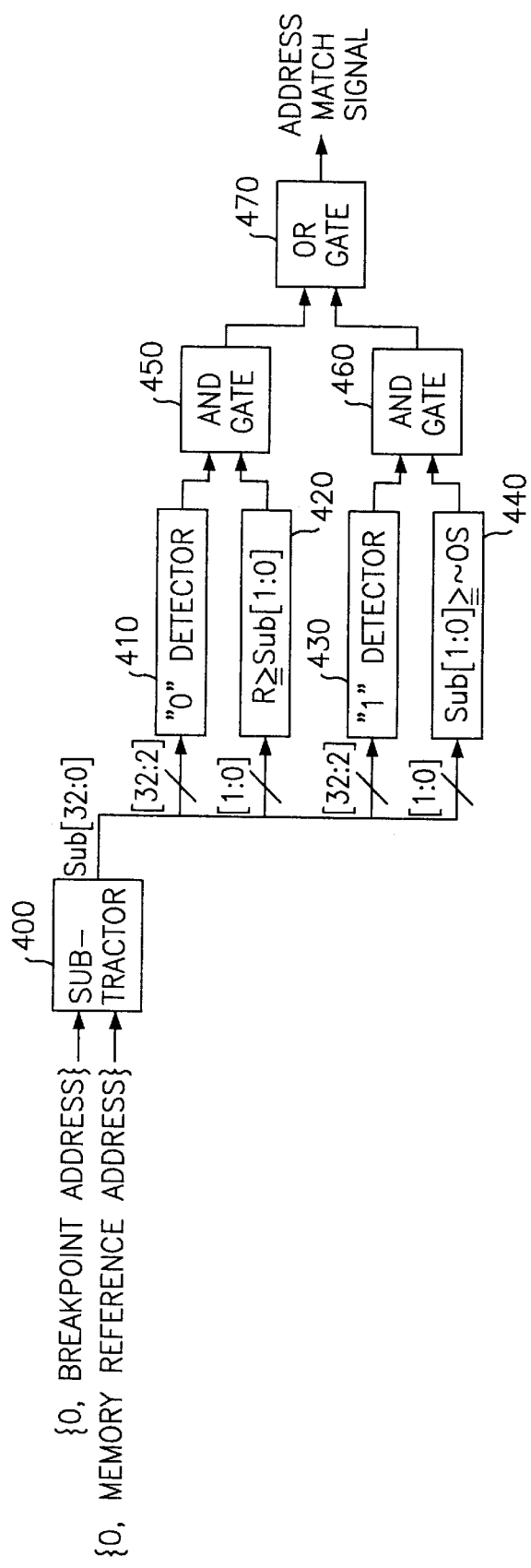
FIG. 4 is an internal block diagram of an address match circuit in the breakpoint interrupt generation apparatus shown in FIG. 2 according to one preferred embodiment of the present invention.

FIG. 4 is an. internal block diagram of the address match circuit portion of the breakpoint interrupt generation apparatus shown in FIG. 2 according to one preferred embodiment of the present invention.

As shown in the drawing, the address match circuit portion 230 comprises a subtractor 400, a first detector 410, a first comparator 420, a second detector 430, a second comparator 440, a first AND gate 450, a second AND gate and an OR gate 470. The subtractor 400 subtracts the selected address (which corresponds to the memory reference address described in the prior art) from the address control logic 200 from the breakpoint address from the breakpoint address register 210. The first detector 410 detects that the upper bits, except for the least two significant bits, of the subtracted result are all "0", when the subtracted result Sub[32:0] is positive value. The first comparator 420 compares the least two significant bits with the range value R, so as to detect that the least two significant bits is equal to or less than the range value R. The second detector 430 detects that the upper bits, except for the least two significant bits, of the subtracted result are all "1", when the subtracted result Sub[32:0] is negative value. The second comparator compares the least two significant bits with the inverted OS (that is −OS), so as to detect that the least two significant bits is equal to or larger than the inverted OS. The first AND gate 450 performs a logic AND operation on the outputs of the first detector 410 and the first comparator 420. The second AND gate 460 performs a logic AND operation on the outputs of the second detector 430 and the second comparator 440. The OR gate 470 performs a logic OR operation on the outputs of the first and the second AND gates 450 and 460, so as to produce a match signal intended.

Considering the address match process, the difference from Mstart to Bstart is firstly produced by the subtractor 400. At this time, the two address values are non-signed value, so it is required that one bit of "0" should be added to the most significant bit of the respective address applied to the subtractor 400. The subtracted result is 33 bits and the most significant bit represents whether the subtracted result is positive or negative. That is, "0" of the most significant bit of the subtracted result represents 'positive value', whereas "1" thereof represents 'negative value'. Thus, using the least two significant bits and the other upper bits of the subtracted result, the address matching is made. More specifically, when the subtracted result is positive, it is checked whether the upper 31 bits are all "0" and the least two significant bits is equal to or less than the range value R. Also, when the subtracted result is negative, it is checked whether the upper 31 bits are all "1" and the least two significant bits is equal to or larger than the inverted OS.

As described above, the present invention is devised on the point that the operation speed of the processor is not critical for debugging. The n addresses generated for one cycle can be re-arranged one-by-one by hardware. According to the present invention, the breakpoint can be generated by the hardware for re-arrangement, a breakpoint register having only one input port and comparators, one of which is provided for the respective breakpoint address register. Thus, the required hardware resources can be reduced, thereby reducing the required chip area and the power consumption.

In addition, the present invention can implement the address match circuit portion of the breakpoint interrupt generation apparatus, in which there is no constraint on the breakpoint address and the range values, by using small amount of hardware resources, thereby reducing the required chip area and the power consumption.

While the present invention has been described with respect to certain preferred embodiments only, other modifications and variations may be made without departing from the sprit and scope of the present invention as set forth in the following claims.

What is claimed is:

1. A breakpoint interrupt generation apparatus in an n-way superscalar microprocessor comprising:
    an address control means for receiving a plurality of addresses and a plurality of request signals generated for memory access and for producing the received address one-by-one for one cycle;
    a breakpoint address storage for storing an intended address for breakpoint generation;
    a control information storage for storing control information required for breakpoint generation;
    an address match means for comparing the address from said breakpoint address storage with the address applied from the address control means so as to produce a match signal indicating whether the two addresses are identical; and
    an enable means for checking whether a breakpoint is generated every cycle based on the match signal from the address match means, the control information from the control information storage and a bus cycle information and for generating a breakpoint interrupt signal in response to a complete signal from the address control means.

2. The breakpoint interrupt generation apparatus as recited in claim 1, wherein said address control means comprises:
    a finite state machine for generating the address selection signal, the stall signal and the complete signal in response to the request signals from a segment unit; and
    a selection means for selecting one among the plurality of addresses for one cycle in response to the address selection signal.

3. The breakpoint interrupt generation apparatus as recited in claim 1, wherein said control information storage stores an enable information for the breakpoint interrupt generation apparatus, an enable information for the breakpoint address storage, the type and the range of the breakpoint.

4. The breakpoint interrupt generation apparatus as recited in claim 1, wherein, when there is no constraint between the breakpoint address and the range, said address match means comprises:
    a subtracting means for subtracting the breakpoint address of the breakpoint address storage by the selected address from the address control means;
    a first detecting means for detecting that the upper bits except for the least two significant bits of the subtracting result applied from the subtracting means are all "0";
    a first comparing means for detecting that the value of the least two significant bits is equal to or less than the range of the breakpoint address by comparing;
    a second detecting means for detecting that the upper bits except for the least two significant bits of the subtracting result applied from the subtracting means are all "1;";
    a second comparing means for detecting that the value of the least two significant bits is equal to or larger than an inverted operand size of the selected address from the address control means; and
    a logic means for generating an address match signal based on the outputs of the first and the second detecting means and the first and the second detecting means.

5. The breakpoint interrupt generation apparatus as recited in claim 2, wherein said finite state machine includes an idle state and a plurality of states;
    said finite state machine being initiated as the idle state; receiving the request signal corresponding to the address and being transitioned to a state corresponding to the requested address; and then generating the stall signal and address selection signal indicating that the address should be selected.

6. The breakpoint interrupt generation apparatus as recited in claim 4, wherein said logic means comprises:
    a first logic gate for ANDing on the outputs of the first detecting means and the first comparing means;
    a second logic gate for ANDing on the outputs of the second detecting means and the second comparing means; and
    a third logic gate for ORing on the outputs of the first and the second logic gates, so as to produce the address match signal.

7. The breakpoint interrupt generation apparatus as recited in claim 4, wherein the breakpoint address and the selected address from the address control means are 32 bit unsigned value and added with "0" to the most significant bit, so as to be applied to the subtracting means.

8. The breakpoint interrupt generation apparatus as recited in claim 5, wherein said finite state machine is transitioned to the idle state and generates the complete signal to the enable means, when the request signal is no longer applied.

9. The breakpoint interrupt generation apparatus as recited in claim 7, wherein said subtracting means performs 33-bit subtracting operation.

10. The breakpoint interrupt generation apparatus as recited in claim 9, wherein said first and the second detecting means perform the detecting operation on the upper 31 bits of the subtracting result.

11. A breakpoint interrupt generation apparatus in an n-way superscalar microprocessor comprising:

an address control means for inputting n addresses in parallel and then producing one by one the inputted address every cycle and outputting a stall signal and a complete signal, said stall signal indicating that an input operation for the next n addresses should be installed until all of the inputted addresses are outputted, and said complete signal indicating when all of the inputted addresses are outputted;

a breakpoint address memory for storing at least one breakpoint address;

an address match means for comparing the output of the address control means with the breakpoint address, so as to produce an address match signal; and a logic means for checking whether a breakpoint is generated every cycle based on the address match signal from the address match means and generating a breakpoint interrupt signal based on the address match signal when the complete signal is generated.

12. The breakpoint interrupt generation apparatus as recited in claim 11, further comprising a mode register indicating whether an operation mode of the breakpoint interrupt generation apparatus is "debugging mode", wherein said address control means is enabled when the mode register indicates the debugging mode.

13. An address match circuit in a breakpoint interrupt generation apparatus of a superscalar microprocessor, for detecting whether an inputted address corresponds to a predetermined range of address requiring a breakpoint interrupt generation, comprising:

a breakpoint address memory for storing a breakpoint address that is start address requiring a breakpoint interrupt generation;

a range memory for storing the predetermined range of address;

an operand size memory for storing a size value of an operand being performed;

a subtractor for subtracting the inputted address from the breakpoint address; and a detecting means for detecting that the output of the subtractor is equal to or larger than an inverted value of the size value of the operand and that the output of the subtractor is equal to or less than the predetermined range of address.

14. The address match circuit in a breakpoint interrupt generation apparatus of a superscalar microprocessor as recited claim 13, when the output of the subtractor is M-bits and both of the operand size and the address range are represented by L-bits, wherein said detecting means comprises:

a first detector for detecting that all of the upper M-L bits of the output of the subtractor are "0";

a second detector for detecting that all of the upper M-L bits of the output of the subtractor are "1";

a first comparator for comparing so as to detect that the least L bits of the output of the subtractor is equal to or less than the address range;

a second comparator for comparing so as to detect that the least L bits of the output of the subtractor is equal to or larger than an inverted value of the operand size; and a logic means for producing the address match signal based on the outputs of the first and the second detectors and the first and the second comparators.

* * * * *